United States Patent [19]
Mitchell

[11] 3,758,056
[45] Sept. 11, 1973

[54] PARACHUTES
[75] Inventor: John Rothwell Mitchell, Woking, England
[73] Assignee: RFD-GQ Limited, London, England
[22] Filed: Feb. 25, 1972
[21] Appl. No.: 229,308

[30] Foreign Application Priority Data
  Mar. 5, 1971  Great Britain .................. 6,078/71

[52] U.S. Cl. .............................................. 244/152
[51] Int. Cl. ........................................... B64d 17/20
[58] Field of Search ................... 244/152, 142, 149

[56] References Cited
UNITED STATES PATENTS
| | | | |
|---|---|---|---|
| 3,043,543 | 7/1962 | Istel et al. | 244/152 |
| 3,170,661 | 2/1965 | Basnett | 244/152 |
| 2,922,605 | 1/1960 | Turati | 244/149 |
| 3,133,718 | 5/1964 | Stencel | 244/149 X |
| 28,518 | 3/1925 | Cormier | 244/152 |

Primary Examiner—Milton Buchler
Assistant Examiner—Carl A. Rutledge
Attorney—Luke A. Mattare et al.

[57] ABSTRACT

A parachute canopy is shaped so that the internal surface of the inflated canopy is concave near the peripheral hem and is convex nearer the apex of the canopy, vents being provided in the canopy to relieve the circumferential tensions generated within the canopy, which vents are covered by flaps which close the vents, wholly or in part, when the excess pressures have been relieved. The vents can be covered by extensible netting or flaps can have control cords operating by the movements of the canopy fabric or controlled manually by the parachutist.

8 Claims, 9 Drawing Figures

PARACHUTES

This invention relates to parachutes and particularly to parachutes with canopies of ogee or cymoid shape when inflated.

Parachute canopies which can be laid out flat when manufactured and inflate into hemispherical shape are only moderately efficient in relation to the amount of material used and they can be very unstable. Canopies which have shaped gores can be designed to give a much greater efficiency, especially if the cross section of the canopy has an inflexion towards the vent.

A canopy having a curve formed from a cubic equation has been found to be suitable. The effect is to surmount the hemispherical canopy with a concave sided conical fustrum.

If such a canopy is made from a fabric of very low porosity to given maximum efficiency it will inflate rapidly and high circumferential tensions can occur in the canopy fabric at the point of inflexion.

The object of this invention is to provide a canopy of ogee shape which has means for relieving these high circumferential tensions.

According to this invention a parachute canopy is shaped so that the internal surface of the inflated canopy is concave near the peripheral hem of the canopy and is convex nearer the apex of the canopy, and is provided with one or more vents extending at least part of the way from the apex to the peripheral hem of the canopy.

The invention includes a parachute canopy which is shaped so that the internal surface of the inflated canopy is concave near the peripheral hem of the canopy and is convex nearer the apex of the canopy and which is provided with one or more vents extending at least part of the way from the apex to the peripheral hem of the canopy, which vents open and close automatically as the circumferential tensions within the canopy rise and fall respectively.

The invention also includes parachute canopy which is shaped so that the internal surface of the inflated canopy is concave near the peripheral hem of the canopy and is convex nearer the apex of the canopy and which is provided with at least one pair of vents extending at least over that part of the canopy where the surface of the canopy changes from concave to convex, the vents being provided with flaps which can be moved either automatically in accordance with the internal tensions generated within the canopy or by means of control lines within reach of a parachutist, the vents being so arranged that they direct air escaping from the canopy rearwards to the direction of movement of the parachute canopy in flight, both vents of the, or each, pair acting in the same direction.

The parachute canopy according to the invention can have internal flaps which can cover the vents either wholly or in part, which flaps can extend within the canopy to provide overlaps which direct the escaping air towards the rear of the canopy.

The vents can extend all the way from the apex to the peripheral hem of the canopy or can extend over only part of this distance. The vents can be covered by netting or similar open mesh fabric, which can be extensible. The flaps can be connected to cords which can be connected to the sides of the parachute canopy or can be connected to control lines within reach of the parachutist.

The vents are preferably provided in pairs, one or more than one pair being provided as desired, and the vents can be placed symmetrically on either side of the rear of the canopy. Additional vents can be provided for control or other purposes if desired.

The canopy can be made from virtually imporous fabric.

The canopy is preferably made from gores, which would extend from the apex of the canopy to the peripheral hem, but it could be made from strips of material running parallel to the peripheral hem if desired. The gores can be made of differing materials, or the strips can be made of differing materials. When gores are used, each gore can be made from strips of the same type of material or from strips of different material, for example the porosity of the material used for the gores or for strips forming any one gore can vary.

In a canopy formed from gores and having two vents, the vents are preferably placed at about 90° to each other, and each gore can be formed by arranging part of one gore to overlap another gore. The inner part, which is referred to as a flap, can be of a truncated triangular form and can extend over part of a gore or over one or more than one gore. Normally the two vents would both point in the same backward direction in relation to the parachutist.

During deployment of the parachute, it is possible for parts of the canopy to inflate more quickly than other parts of the canopy and malfunctioning can occur if control of the parachute is not maintained. One form of control is to pack the parachute canopy with the vents open and to provide cords connecting the flaps and the canopy. When the canopy is fully inflated these cords are tensioned and the vents are partly closed. In another form of control, cords from the flaps are extended to control lines within reach of the parachutist so that the parachutist can have an over-riding control on the position of the flaps. In a still further form of control, the vents are covered with netting or similar open mesh fabric, which can be extensible. When the canopy is inflating, the net yields sideways to allow excess air to pass through the vents. When the canopy is fully inflated the net resumes its normal size and position to close, or partly close depending on the design of the canopy, the vents. The net prevents any other part of the canopy being blown through the slots during the early stages of deployment of the canopy.

Simple forms only of canopies according to the invention are described hereinafter with reference to the accompanying drawings of which:

Figure 1:
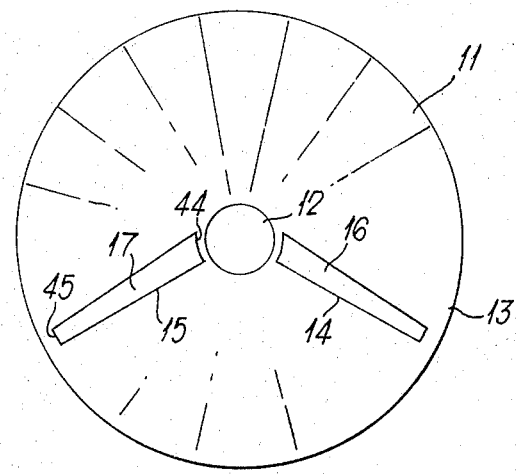
FIG. 1 is a view of a canopy according to the invention seen from below under low pressure.
Figure 2:
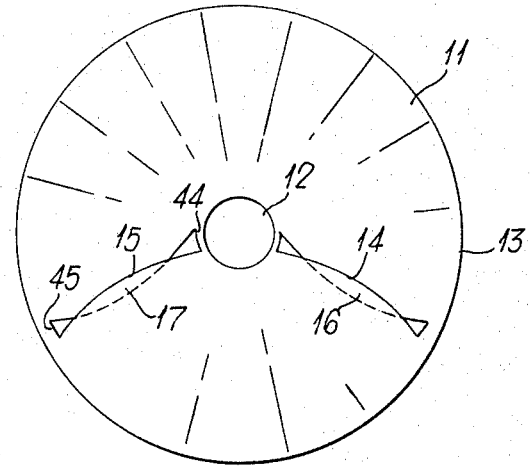
FIG. 2 is a view of the canopy shown in FIG. 1 under high pressure.
Figure 3:
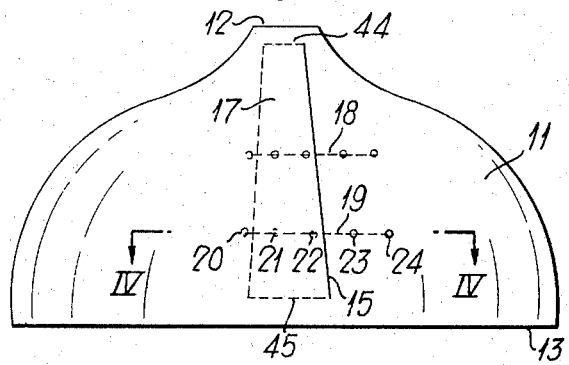
FIG. 3 is an elevation of the canopy shown in FIGS. 1 and 2.

In the embodiment of the invention shown in FIGS. 1, 2, and 3 the canopy 11 is made from a number of gores, not specifically shown, to form a canopy which, when inflated, produces a cross-section of ogee shape having an inflexed curve between the peripheral hem 13 and the apex vent 12 as shown in FIG. 3. The canopy is provided with two openings having forward edges 14 and 15 respectively which are approximately 90° apart. Flaps 16 and 17 are provided, one for each opening, the flaps being joined to the canopy along the edges of the openings away from the edges 14 and 15 and at top and bottom of the flaps as shown for flap 17 at 44 and 45. The openings as shown extend almost from the apex of the canopy to the peripheral hem. The openings can extend from apex to hem or can be shorter as required, for example they could extend over only the upper part of the canopy, or over only the lower part if desired.

The flaps 16 and 17 are shown extending well into the canopy so that air flowing out of the canopy through the vents between the flaps 16 and 17 and the edges 14 and 15 of the canopy is guided by the flaps and the inner side of the canopy towards the rear of the canopy, and so that the vents are sealed by the flaps when the pressure within the canopy is low. When pressure is high within the canopy, the flaps are forced through the vents as shown in FIG. 2 to allow the air to escape from the canopy to relieve the high circumferential tensions built up within the canopy. As the pressure falls the flaps are drawn back into the positions shown in FIG. 1.

Figure 4:
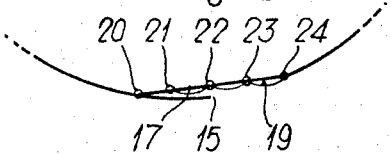
FIG. 4 is a section across part of the canopy shown in FIG. 3 on the line IV — IV of FIG. 3.

To assist the flaps to return into the positions shown in FIG. 1, cords such as 18 and 19 can be provided on the inside of the canopy. These cords are connected to the canopy at points such as 20, 23 and 24 and to the flaps at points such as 21 and 22 (FIGS. 3 and 4).

Figure 5:
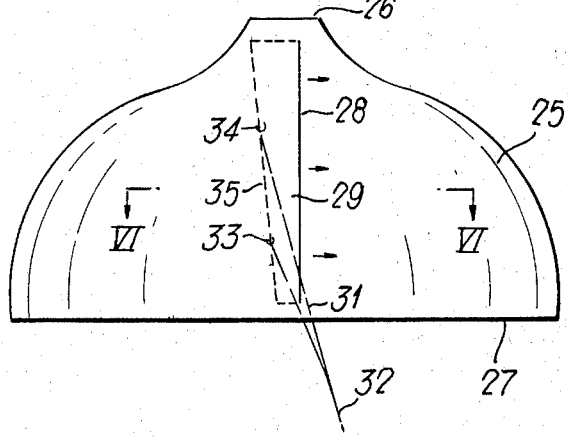
FIG. 5 is an elevation of part of another form of canopy according to the invention.
Figure 6:
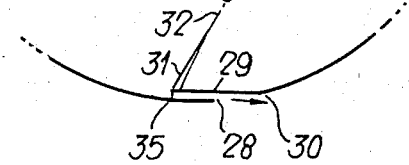
FIG. 6 is a section across part of the canopy shown in FIG. 5 on the line VI — VI of FIG. 5.

In the embodiment shown in FIGS. 5 and 6 the flaps are controlled by lines within reach of the parachutist. In this embodiment, which is similar in form to that shown in FIGS. 1 and 2, the canopy 25 has an apex vent 26 and a peripheral hem 27. Two openings are provided only one of which is shown, the opening being between the points 28 and 30 of the canopy and the flap 29 is attached to the canopy along the edge 30 and at top and bottom of the flap. Control lines 31 are attached to the free edge 35 of the flap at points 33 and 34, which control lines are joined to a single operating line 32, which would terminate in a loop or ring within reach of the parachutist. The second flap on the canopy would have similar control and operating lines.

Figure 7:
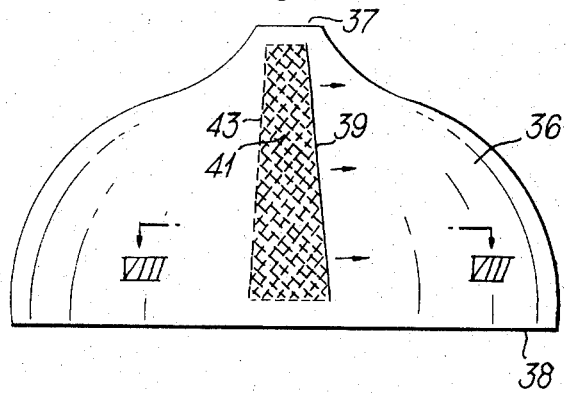
FIG. 7 is an elevation of part of a still further form of canopy according to the invention.
Figure 8:
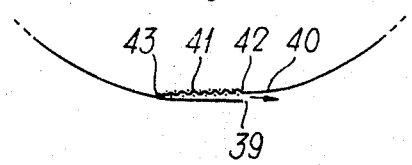
FIG. 8 is a section across part of the canopy shown in FIG. 7 on the line VIII — VIII of FIG. 7

The vents can be closed by netting or similar open mesh fabric if desired to assist the canopy to recover its shape after pressure is relieved. Such an arrangement is shown in FIGS. 7 and 8 in which the canopy 36, has a vent 37, a peripheral hem 38, and a pair of openings, of which one only is shown in the Figures. The opening is defined by the edge 39 of the canopy and the edge 42 of the flap 40. A netting strip 41, of any suitable shape, is connected to the flap 40 along the edge 42 and to the canopy along edge 43 and along the top and bottom of the netting strip, The netting can be extensible if desired. When excess pressure occurs, the netting stretches so that the vent between the edges 39 and 42 opens to allow the excess air to escape from the canopy. When the pressure is relieved the netting pulls the edge 42 back to its normal position to close, or almost close the vent according to the design requirements. In this embodiment the vent is shown extending only over the part of the canopy including the inflex curve. The vent can extend from apex to hem, or over any part of this distance as required.

Figure 9:
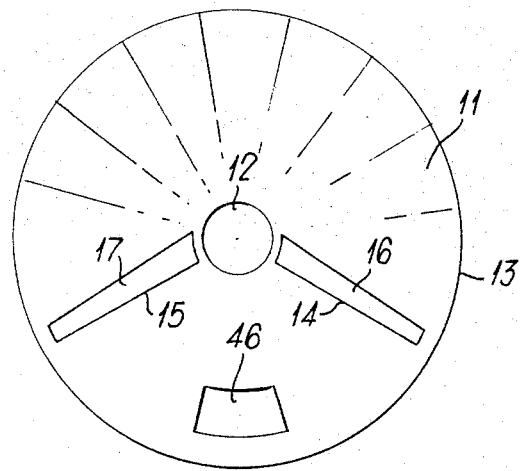
FIG. 9 is a view of a canopy similar to that shown in FIG. 1 but with an additional opening at the rear of the canopy.

More than one pair of openings as described above can be provided in a single canopy if required, and the openings of different pairs need not be of similar size. Other openings can also be provided in the canopy if desired. For example a rear opening to ensure that the canopy flies in the required direction can be provided. Such an opening is shown in FIG. 9 in which the canopy 11 has an apex vent 12, a peripheral hem 13, openings according to the invention at 14 and 15 provided with flaps 16 and 17, and a rear opening of conventional form at 46. The rear opening can be controlled by the parachutist or by other means if desired.

Rigging lines are provided connecting the canopy to the load, which can be a parachutist, and could be stitched to the canopy, for example along the gore seams. These lines could pass from the hem of the canopy over the outside to the apex of the canopy or could pass through tunnels formed along gore seams of the canopy, or could terminate at the hem of the canopy, in which case they could be connected to other lines which pass over the outside of the canopy and are connected to the apex of the canopy. The lines could pass across the apex of the canopy and extend from hem to hem of the canopy. A vent ring can be provided.

The invention as described above applied to canopies in which the peripheral hem, the points of change of curvature of the canopy from concave to convex and the apex of the canopy are in approximately parallel planes. The invention can be applied to canopies in which these planes are not parallel. For example the plane of the apex of the canopy could slope so that it met or passed through the plane including the plane including the points of change of curvature of the canopy, in which case only part of the internal surface of the canopy would be ogee shaped and part would have a concave surface only. Also part of the internal surface could be flat if desired, the flat surface being adjacent the peripheral hem of the canopy or at or near the apex vent, or it could join two concave or two convex parts of the surface or a concave part to a convex part of the surface. More than one flat part could be provided.

In the embodiments shown in FIGS. 5 and 6, the parachutist can control the rate of descent of the parachute and the direction of flight by selective manipulation of the control lines 32, but the control differs according to the position of the flaps 29 when the control lines 32 are pulled. If the flaps have been moved by internal stresses into the positions shown in FIG. 2, pulling on the associated control line closes, or partly closes, the opening between the edge 28 and flap 29, whilst if the parachute is flying with the flaps within the canopy, as shown in FIGS. 1, 5 and 6, pulling on the control lines 32 opens the aperture between the edge 28 and the flap 29.

I claim:

1. A parachute canopy which is shaped so that the internal surface of the inflated canopy is concave near the peripheral hem of the canopy and is convex nearer the apex of the canopy, said canopy having at least one pair of vents therein extending at least over that part of the canopy where the surface of the canopy changes from concave to convex, flaps connected to the canopy adjacent the vents and including means to effect opening and closing of the flaps over the vents in accordance with the internal tensions generated within the canopy, and control lines connected to the flaps and within reach of a parachutist to effect manual operation of the flaps.

2. A parachute canopy as claimed in claim 1 in which additional vents are provided for directional control or other purposes.

3. A parachute canopy as claimed in claim 1 in which the vents are arranged so that they direct air escaping from the canopy rearwards to the direction of movement of the parachute canopy in flight, both vents of the pair acting in the same direction.

4. A parachute canopy shaped so that the internal surface of the inflated canopy is concave near the peripheral hem of the canopy and is convex nearer the apex of the canopy, said canopy having at least one vent therein extending over at least a portion of the distance between the apex and peripheral hem of the canopy in a direction substantially perpendicular to the peripheral hem of the canopy, a flap attached along a longitudinal edge thereof to said canopy adjacent said vent, said edge extending substantially perpendicular to the peripheral hem of the canopy, said flap attached to said canopy at two corners of the flap opposite said edge so that said flap opens and closes the vent as the circumferential tensions within the canopy rise and fall, respectively.

5. A parachute canopy as claimed in claim 4 in which two vents are provided spaced at approximately 90° to each other.

6. A parachute canopy as claimed in claim 4 in which cords are attached to the flap to assist the closure of the vents.

7. A parachute canopy as claimed in claim 4 in which the flap include netting or open mesh fabric connected to said canopy across said vent and which distorts when the interval pressure within the canopy rises to allow the vent to open and which recovers its normal size when the internal pressure falls to reduce the size of the vent.

8. A parachute canopy as claimed in claim 4 in which additional vents are provided for directional control or other purposes.

* * * * *